United States Patent [19]

Onoue

[11] 4,161,776

[45] Jul. 17, 1979

[54] FLYBACK TRANSFORMER WITH HIGH TENSION CONNECTOR

[75] Inventor: Shoji Onoue, Musashino, Japan

[73] Assignee: Denki Onkyo Co., Ltd., Tokyo, Japan

[21] Appl. No.: 815,456

[22] Filed: Jul. 13, 1977

[51] Int. Cl.[2] .............................................. H02M 7/00

[52] U.S. Cl. .................................... 363/146; 336/107; 339/74 R; 339/253 R

[58] Field of Search ............. 336/107, 192; 339/74 R, 339/253 R; 363/146; 315/1

[56] References Cited

U.S. PATENT DOCUMENTS

| | | | |
|---|---|---|---|
| 2,484,525 | 10/1949 | Norris | 339/74 R |
| 2,524,701 | 10/1950 | Grill | 339/74 R |
| 3,229,149 | 1/1966 | Watanabe et al. | 315/1 |
| 3,448,323 | 6/1969 | Owens | 315/1 |
| 3,493,917 | 2/1970 | Glowacz | 339/74 R |
| 4,016,478 | 4/1977 | Anders et al. | 363/67 |

*Primary Examiner*—William M. Shoop
*Attorney, Agent, or Firm*—Armstrong, Nikaido, Marmelstein & Kubovcik

[57] ABSTRACT

A low tension and a high tension coil on a flyback transformer are coupled together with an output rectifier connected with the high tension coil by enclosure of an electrically insulating material. A hollow cylindrical connector body of an electrically insulating material is attached to the enclosure, and has one end of a greater inner diameter than that of the other end, with a step formed intermediate the both ends. Said one end of the connector body is disposed within the enclosure and is adapted to receive a conductive cap electrically connected with the rectifier while said other end opens outside the enclosure. The flyback transformer is mounted on a television receiver, and the end of a high tension lead wire is inserted into the connector body of the flyback transformer through said other end in order to supply the rectifier output to a cathode ray tube. At its inner end, the high tension lead wire is rigidly formed with a fastener of an electrically conductive material and having a plurality of resilient wings, which engage the conductive cap and are locked by the step when the inner end is inserted into the connector body.

5 Claims, 5 Drawing Figures

FLYBACK TRANSFORMER WITH HIGH TENSION CONNECTOR

BACKGROUND OF THE INVENTION

The invention relates to a flyback transformer for use in a television receiver, and more particularly to the construction of a connector for a high tension lead wire which is used to supply a transformer output to the anode of a cathode ray tube.

Recently a flyback transformer is manufactured in compact overall configuration by forming an integral coil assembly which is mounted on a core. The coil assembly includes a low tension and a high tension coil and a rectifier for rectifying a high tension output from the high tension coil, these components being integrally encapsulated in an insulating resin. By way of example, U.S. Pat. No. 3,229,149 discloses an output end of a high tension coil which is permanently connected through a diode with a high tension lead wire, with the coil and the diode as well as the junction therebetween being integrally encapsulated in a wax, rubber or synthetic resin. However, in this arrangement, if a failure is found in either coil assembly or high tension lead wire in the course of the manufacturing, the entire assembly must be disposed as defective, thus causing an increased waste and cost. A relatively large thickness and high stiffness of the high tension lead wire presented difficulties and degraded the operational efficiency when a finished flyback transformer is packaged, shipped or mounted on a television receiver where the entire assembly is integrally encapsulated in synthetic resin.

U.S. Pat. No. 4,016,478 discloses a flyback transformer which avoids such problems. Specifically, in the disclosed transformer, the high tension lead wire is not permanently connected with the coil assembly, but is connected therewith through a socket connector so as to be replaceable whenever necessary. The socket connector comprises a socket provided on the part of the coil assembly, and a plug attached to the high tension lead wire. The socket comprises a cylindrical portion having a plurality of slits formed therein, and a clamping screw which threadably engages around the cylindrical portion for exerting a centripetal pressure thereto. The end of the high tension lead wire which includes the plug is inserted into the cylindrical portion and is firmly gripped therein by tightening the clamping screw. However, with a flyback transformer of this type, the clamping screw must be turned when attaching the lead wire to a television receiver, and a satisfactory electrical connection may not be achieved if the operation is imperfect. Since it is usually unnecessary to remove the high tension lead wire after the flyback transformer is once mounted on the television receiver, it is desirable that the lead wire be locked in place after such mounting.

SUMMARY OF THE INVENTION

It is an object of the invention to provide a flyback transformer having an associated high tension lead wire which is separately manufactured and which is adapted to be rigidly connected with the transformer in locked manner after the transformer has been mounted on a television receiver.

It is a specific object of the invention to provide a flyback transformer having a connector for a high tension lead wire which is simple in construction and easy to manufacture.

It is another object of the invention to provide a connector for high tension lead wire which prevents an electric discharge which may occur along the lead wire.

It is a further object of the invention to provide a connector for high tension lead wire which prevents ingress of moisture.

In accordance with the invention, a low tension and a high tension coil on a flyback transformer are coupled together with an output rectifier connected with the high tension coil by an enclosure of an electrically insulating material. A hollow cylindrical connector body of an electrically insulating material is attached to the enclosure, and has one end of a greater inner diameter than that of the other end, with a step formed intermediate the both ends. Said one end of the connector body is disposed within the enclosure and is adapted to receive a conductive cap electrically connected with the rectifier while said other end opens outside the enclosure. The flyback transformer is mounted on a television receiver, and the end of a high tension lead wire is inserted into the connector body of the flyback transformer through said other end in order to supply the rectifier output to a cathode ray tube. At its inner end, the high tension lead wire is rigidly formed with a fastener of an electrically conductive material and having a plurality of resilient wings, which engage the conductive cap and are locked by the step when the inner end is inserted into the connector body.

In a preferred embodiment of the invention, said other end of the connector body projects out of the enclosure and comprise a plurality of axially extending lips formed by a plurality of slits therebetween, each lip having a slight inward projection. An insulating cap of a resilient material is disposed around the end of the high tension lead wire, and urges the individual lips inwardly so that their projections firmly grip the high tension lead wire when the end of the lead wire is inserted into the connector body.

DESCRIPTION OF PREFERRED EMBODIMENTS

Figure 1:
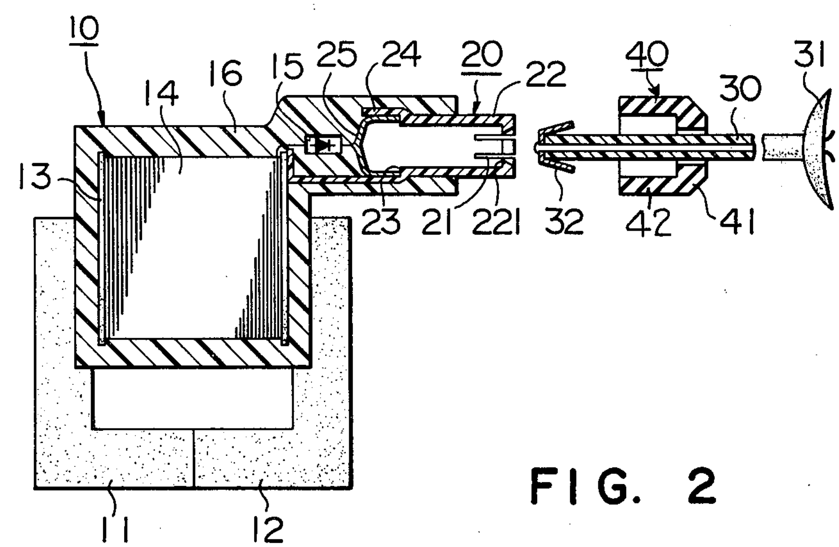
FIG. 1 is a schematic view, partly in section, of the flyback transformer according to the invention before it is coupled with a high tension lead wire.

Referring to FIG. 1, there is shown a coil assembly 10 which is fitted on the upper limbs of a pair of U-shaped core halves 11, 12. The assembly 10 comprises a coil bobbin 13, and a low tension and a high tension coil, generally shown at 14, which are disposed on the bobbin. It will be understood that the core halves 11, 12 are clamped together by known clamping means to interconnect them, thus forming a closed magnetic path extending through the low tension and the high tension coil. A hollow cylindrical connector body 20 is formed of an electrically insulating resin material, and its one end 24 includes an extension which is secured to the bobbin 13. The other end of the connector body 20 is formed with four axially extending slits 21, thereby forming four resilient lips 22. At its free end, each lip 22 carries an inwardly extending projection 221 of a short length which extend toward the center axis of the connector body. Said one end 24 of the connector body 20 has a greater inner diameter than the other end, thereby forming a step 23 therebetween. The end 24 is closed by a conductive cap 25 of an electrically conductive material such as brass which is fitted into the end 24 and frictionally retained against the step 23. A rectifier 15 which may comprise silicon diode is connected between the output end of the high tension coil and the conductive cap 25. The coils 14, rectifier 15 and connector body 20 including the conductive cap 25, exclusive of the region of the lips 22 at the other end thereof, are encapsulated by integrally molding a silicone rubber, 1-2 polybutadiene resin or epoxy resin therearound.

Figure 2:
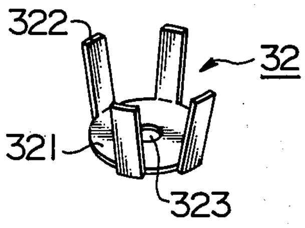
FIG. 2 is a perspective view of a fastener shown in FIG. 1.

A high tension lead wire 30 having an insulating coating is prepared separately from the coil assembly 10. At its one end, the high tension lead wire 30 is mechanically and electrically connected with an anode cap 31 for connection with the anode of a cathode ray tube (not shown) while the other end is soldered with a fastener 32 of a resilient conductive material such as phosphor bronze. Adjacent to the other end of the lead wire 30, an insulating cap 40 is slidably fitted thereon. As shown in FIG. 2, the fastener 32 comprises a disc 321 of substantially the same diameter as the outer diameter of the lead wire 30, and a plurality of wings 322, four in the example shown, which are disposed at an equal interval around the circumference of the disc 321 and extend radially outward. The disc 321 is centrally formed with an opening 323 for passing the conductor of the lead wire 30 therethrough. In this manner, the fastener 32 is in the form of an arrowhead at the end of the high tension lead wire 30. The insulating cap 40 is formed of a material such as silicone rubber, for example, and includes a base 41 which slidably engages the lead wire 30, and a cylindrical cover 42. As will be described later, the cover 42 is sized and configured in connection with the outer periphery of the connector body 20.

Describing now the connection between the lead wire 30 and the connector body 20, the fastener 32 is pressed into the connector body 20. At this time, the lips 22 at the other end of the connector body 20 are spread radially outward while the wings 322 on the fastener 32 are compressed inwardly. When the fastener 32 moves past the projections 221 of the lips 22, the lips 22 return to their original position. The wings 322 of the fastener remain compressed even though they may slightly restore resiliently. When the lead wire 30 is driven further inward into the connector body 20, the fastener 32 eventually enters the interior of the conductive cap 25, whereupon the wings 322 are allowed to spread outward into contact with the conductive cap 25. In this manner, the lead wire 30 is locked against withdrawal by virtue of the engagement of the wings 322 against the step 23 formed in the connector body 20.

When mounting, the anode cap 31 is connected with the anode of a cathode ray tube, and the insulating cap 40 is fitted over that portion of the connector body 20 which is exposed out of the insulating layer 16. By choosing an inner diameter of the cover 42 which is slightly less than the outer diameter of the adjacent end of the connector body 20, the resilience of the material of the cover 42 urges the lips 22 radially inward to cause the projections 221 to bear against the high tension lead wire 30 with a sufficient force to prevent an angular movement thereof about its axis.

Figure 3:
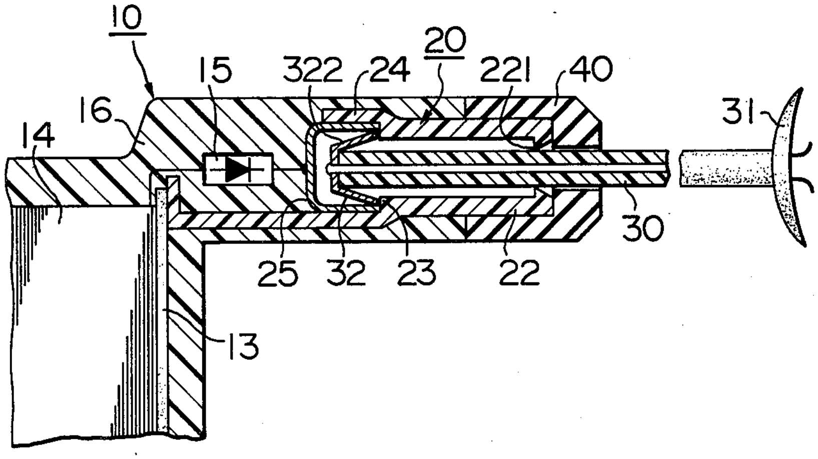
FIG. 3 is a fragmentary view, partly in section, of the flyback transformer coupled with the high tension lead wire.

As will be noted from FIG. 3, with the arrangement of the invention, the wings 322 on the fastener 30 engage the conductive cap 25 as soon as the end of the wings is engaged with the step 23 in the connector body 20, thus preventing a withdrawal thereof and completing a connection thereof with the rectified high tension output from the rectifier 15. The insulating cap 40 covers the entire exposed portion of the connector body 20, thus preventing ingress of moisture into the connector body and also preventing a discharge from the internal parts thereof.

Figure 4:
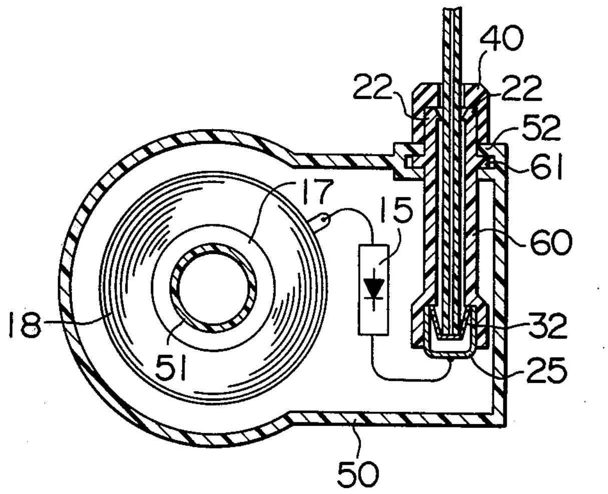
FIG. 4 is a fragmentary, schematic view of another embodiment of the invention in which the flyback transformer incorporates insulating casing.

FIG. 4 shows another embodiment of the invention in which the coil assembly and the rectifier of the flyback transformer are separately contained in a common insulating casing 50. In this Figure, parts corresponding to those shown in FIGS. 1 to 3 are designated by like numerals. The casing 50 includes a core receiving cylindrical portion 51 around which a low tension and a high tension coil 17, 18 are concentrically mounted. The insulating case 50 includes a detent, which mates with a radial rib 61 formed peripherally of a connector body 60, thus supporting the latter. The connector body 60 is constructed in the similar manner as the connector body 20 and therefore will not be described. Lips 22 projects out of the casing 50, and a conductive cap 25 located at the other end of the casing 50 is electrically connected through a rectifier 15 disposed therein with the high tension coil 18. The hollow space within the casing 50 is filled with a flame-proof insulating resin.

Figure 5:
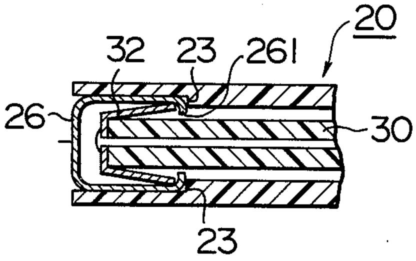
FIG. 5 is a sectional view of a modification of the conductive cap shown in FIGS. 1 and 4.

FIG. 5 shows another form of the conductive cap. In this example, a conductive cap 26 is again U-shaped in cross section, and has an inwardly curved edge 261 formed around the opening for engagement with the step 23 in the connector body. The edge 261 is adapted to mate with the wings 322 of the fastener 32, thus improving the electrical connection between the cap 26 and the fastener 32.

What is claimed is:

1. A flyback transformer for a television receiver including a core, a coil assembly mounted on the core and including a low tension and a high tension coil and also including a rectifier connected with the high tension coil for rectifying a high tension output therefrom, the coil assembly being contained in an enclosure of an electrically insulating material together with the rectifier, a high tension lead wire having an insulating coating, and fastener means for providing an electrical connection between the high tension lead wire and the rectifier; characterized in that the fastener means comprises a tubular connector body formed of an electrically insulating material and having one end of a greater inner diameter than that of the other end, with a step between the both ends, the connector body being supported by the enclosure and having said other end opening outside the enclosure said other end being formed with a plurality of substantially axially extending slits with a plurality of inwardly extending lips at the ends thereof, a conductive cap fitted into the space at said one end of the connector body and positioned against the step and electrically connected with the rectifier, and a fastener of an electrically conductive material firmly mounted on and electrically connected with the high tension lead wire and adapted to engage the conductive cap and to be locked by the step as the end of the high tension lead wire is inserted into the connector body said fastener means including a resilient insulating cap fitted on the end of the high tension lead wire and which is adapted to be fitted over said other end of the connector body to resiliently urge the lips inwardly to firmly grip the high tension lead wire.

2. A flyback transformer according to claim 1 in which the fastener comprises a disc of substantially the same diameter as the outer diameter of the high tension lead wire inclusive of its insulating coating and mechanically and electrically connected with the high tension lead wire, and a plurality of resilient wings disposed at an equal interval around the periphery of the disc and extending in a direction which forms an acute angle with the axial direction of the high tension lead wire.

3. A flyback transformer according to claim 1 in which the conductive cap is cup-shaped and having an inwardly extending flange along its opening, said flange being adapted to engage with the step in the connector body and the fastener.

4. A flyback transformer according to claim 1 in which the enclosure is formed by a resin material cast around the coils and the rectifier, said one end of the connector body being embedded into the cast resin to be supported thereby.

5. A flyback transformer according to claim 1 in which the enclosure comprises a casing which contains the coils and the rectifier, the connector body being secured to the casing in a manner such that said one end thereof is located within the casing, the casing being filled with an insulating resin.

* * * * *